April 23, 1940.    C. C. FARMER    2,198,032
ANTISKID DEVICE
Filed July 27, 1938
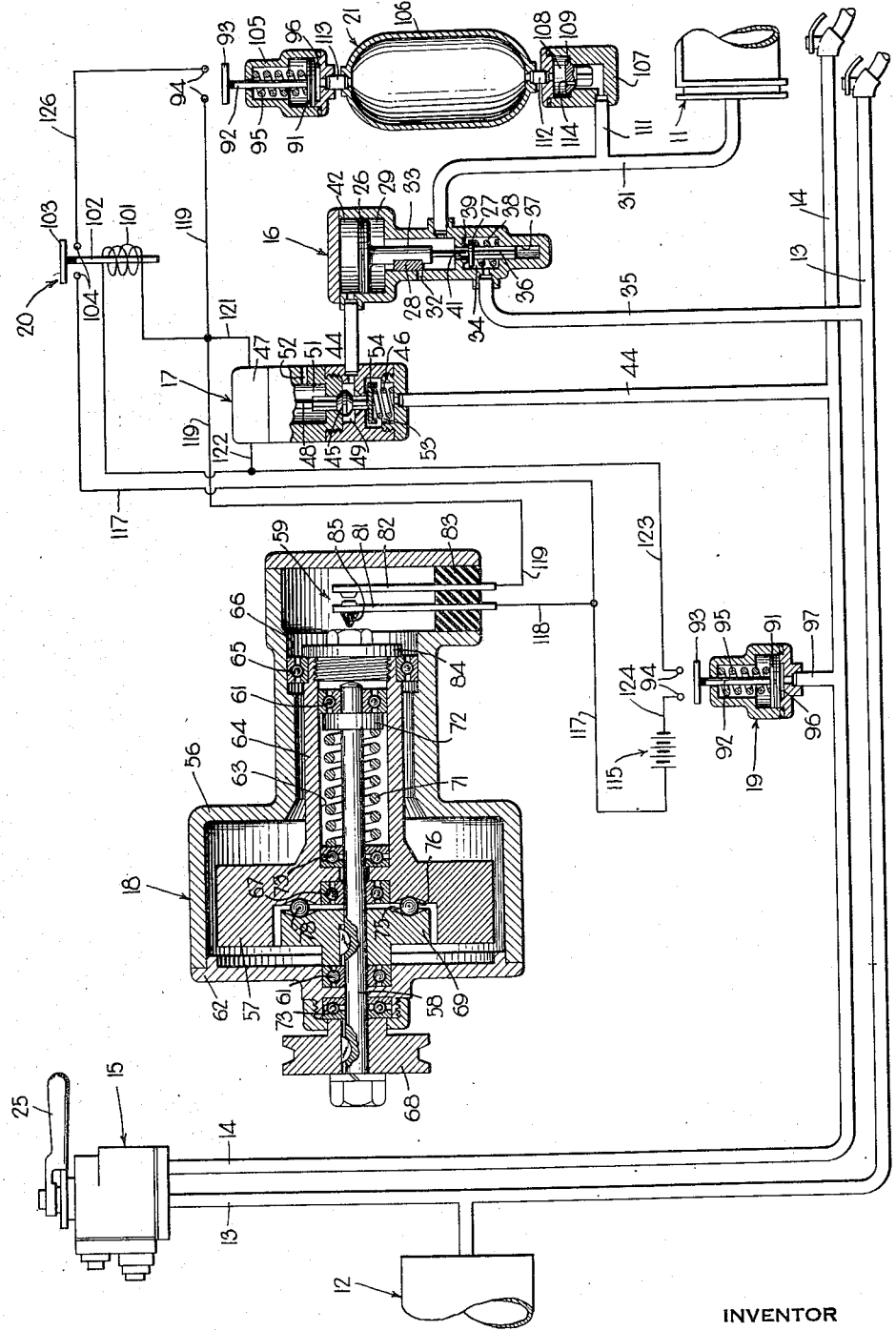
INVENTOR
CLYDE C. FARMER
BY A. M. Higgins
ATTORNEY Patented Apr. 23, 1940

2,198,032

UNITED STATES PATENT OFFICE 2,198,032

ANTISKID DEVICE

Clyde C. Farmer, Pittsburgh, Pa., assignor to The Westinghouse Air Brake Company, Wilmerding, Pa., a corporation of Pennsylvania Application July 27, 1938, Serial No. 221,533

11 Claims. (Cl. 303—21)

This invention relates to antiskid devices for guarding against skidding or sliding of the wheels of vehicles such as railway cars and trains, and has particular relation to a vehicle brake equipment including means automatically responsive to the slipping of a vehicle wheel due to the application of the brakes for releasing the brakes on the slipping wheel to prevent skidding or sliding thereof.

In the present application, the term "skid" or "slide" refers to the dragging of a vehicle wheel along a road or rail surface in a locked or non-rotative state, whereas the term "slip" refers to the rotation of the vehicle wheel at a speed less than that corresponding to vehicle or rail speed at a given instant.

Various devices have been proposed, principally of the rotary inertia type, for effecting release of the brakes on an individual wheel or wheel and axle unit at the instant that the wheel or wheel and axle unit begins to slip, in order to prevent the slipping wheel from decelerating to a locked or non-rotative state and cause it to accelerate back toward a speed corresponding to vehicle or rail speed. Such devices inherently operate to cause reapplication of the brakes on a slipping wheel before it returns fully to a speed corresponding to vehicle speed.

It is desirable to provide means for preventing reapplication of the brakes on a slipping wheel until after it returns fully to a speed corresponding to a vehicle or rail speed for the reason that the reapplication of the brakes on a slipping wheel which is accelerating back toward a speed corresponding to vehicle speed may cause it to immediately again decelerate rapidly toward a locked or non-rotative state and, if the speed of the wheel is sufficiently low at the time of reapplication of the brakes, may even cause it to lock and slide.

In addition to insuring against sliding of a vehicle wheel, the holding off of a reapplication of the brakes on a slipping wheel until it returns fully to a speed corresponding to vehicle or rail speed minimizes the possibility of repeated slipping cycles and thus minimizes the waste of fluid under pressure which would otherwise occur due to the repeated exhausts of fluid under pressure from a brake cylinder. In the case of a single car, repeated slipping cycles and the consequent repeated exhausts of fluid under pressure from the brake cylinder may be tolerable but in the case of a train of cars, wherein a plurality of brake cylinders may be repeatedly exhausted during an application of the brakes, the fluid pressure supply may be reduced to an intolerable degree rendering the application of the brakes on the train inadequate.

It is an object of my invention, therefore, to provide novel means for preventing the reapplication of the brakes on a slipping wheel until it returns fully to a speed corresponding to vehicle or rail speed.

More specifically, it is an object of my invention to provide pneumatic timing means which is set in operation upon the slipping of a vehicle wheel to prevent reapplication of the brakes on a slipping wheel for a certain uniform time regardless of variations in the rotative condition of the wheel while slipping.

The above objects, and other objects of my invention which will be made apparent hereinafter, are attained by means of an embodiment of my invention shown in the single figure of the accompanying drawing.

Description of equipment

Referring to the single figure of the accompanying drawing, the equipment shown comprises one or more brake cylinders 11 for effecting operation of the brakes associated with a single wheel, a pair of wheels or a plurality of pairs of vehicle wheels, not shown; a source of fluid under pressure such as a main reservoir 12 located upon the control or traction car of a train; a supply pipe 13 connected to the main reservoir and extending throughout all cars of the train; a pipe 14, hereinafter called the straight-air pipe, likewise extending throughout all cars of the train; a manually operable self-lapping brake valve 15 for controlling the pressure in the straight-air pipe 14; a relay valve device 16 for controlling the supply of fluid under pressure to and the release of fluid under pressure from the brake cylinder 11; a magnet valve device 17 for controlling the operation of the relay valve device 16, a wheel-slip responsive device 18; a pressure-operated switch 19 responsive to the pressure in the straight-air pipe 14; a self-holding electrical relay 20; and a time controlled switch device 21.

Considering the parts of the equipment in further detail, the self-lapping brake valve 15 is of the type described and claimed in Patent No. 2,042,112 of Ewing K. Lynn and Rankin J. Bush and it is deemed unnecessary, therefore, to describe the brake valve 15 except functionally. When the operating handle 25 of the brake valve 15 is in its normal brake release position, the brake valve is conditioned to vent the straight-air pipe 14 to atmosphere. When the handle 25 is shifted horizontally into a so-called application zone out of its normal release position, the brake valve is conditioned to establish communication through which fluid under pressure is supplied from the supply pipe 13 to the straight air pipe 14, the brake valve 15 being automatically self-lapping to establish a pressure in the straight-air pipe 14 substantially proportionate to the degree of displacement of the operating handle out of its normal release position. Should the pressure in the straight-air pipe 14 tend to reduce, due to leakage or for other reasons made apparent hereinafter, from a pressure corresponding to the position of the operating handle, the brake valve is automatically operative to supply further fluid under pressure to the straight-air pipe to maintain a pressure therein corresponding to the position of the handle. The utility of this pressure maintaining feature of the brake valve 15 will be made apparent hereinafter in connection with a reapplication of the brakes following slipping of the wheels.

The relay valve device 16 is of conventional type and comprises a suitable casing containing a piston 26 for operating a supply valve 27 of the disc type and a release valve 28 of the slide valve type. The release valve 28 is contained in a chamber 29 at one side of the piston 26 and is interlocked with the stem 33 of the piston so as to be operatively shifted upon its associated valve seat formed on the casing to lap or uncover an exhaust port 32 opening out of the chamber 29 in correspondence with the movement of the piston. Chamber 29 is constantly connected to the brake cylinder 11, as through a pipe 31.

The supply valve 27 is contained in a chamber 34 of the casing that is constantly connected to the supply pipe 13 through a branch pipe 35. The supply valve 27 has a fluted stem 36, which operates slidably in a suitable bore 37 in the casing, and a coil spring 38 interposed in concentric relation to the stem 36 between the valve 27 and the casing yieldingly urges the valve into seated relation on an associated annular rib seat 39 to close communication through a port or passage 41 connecting the chamber 34 and the chamber 29.

The end of the piston stem 33 is of reduced diameter and extends through the port 41 into contact with the inner seated face of the supply valve 27.

When fluid under pressure is released from a chamber 42 formed in the casing of the relay valve device 16 at the side of the piston 26 opposite to the chamber 29, the spring 38 yieldingly urges the supply valve 27 into seated relation on the annular rib seat 39 and the valve engages the stem 33 of the piston 26 to shift the piston to a normal position in which the release valve 28 laps or covers the exhaust port 32. When fluid under pressure is supplied to the chamber 42, the piston is shifted in a direction to unseat the supply valve 27 and at the same time shift the release valve 28 without uncovering the exhaust port 32. Fluid under pressure is thus supplied from the supply pipe 13 to the brake cylinder 11 by way of the pipe 35, chamber 34, passage 41, chamber 29 and pipe 31. When the pressure established in the chamber 29 is substantially equal to the pressure established in the chamber 42, the spring 38 is effective to reseat the supply valve 27 to cut off the further supply of fluid under pressure to the brake cylinder.

If the pressure in the chamber 42 is reduced below the pressure established in the chamber 29 and brake cylinder 11, the piston 26 is shifted in a direction to cause the release valve 28 to uncover the exhaust port 32, the supply valve 27 remaining seated, thus causing fluid under pressure to be released from the brake cylinder.

The magnet valve device 17 is provided for controlling communication through a branch pipe 44 connecting the straight-air pipe 14 and the chamber 42 of the relay valve device 16. The magnet valve device 17 comprises a double beat valve 45 normally urged to an upper seated position by a coil spring 46 and operated to a lower seated position upon energization of an electromagnet winding or solenoid 47 through the medium of a plunger 48 associated with the electromagnet winding. The double beat valve 45 is contained in a chamber 49 in the casing of the magnet valve device that is constantly connected by one section of branch pipe 44 to the chamber 42 of the relay valve device 16 and is provided with oppositely extending fluted stems which are guided in suitable aligned bores in the casing, one of which connects chamber 49 to a chamber 51 that is constantly open to atmosphere through an exhaust port 52, and the other of which connects chamber 49 to a chamber 53 that is constantly connected to the straight-air pipe 14 through the other section of the branch pipe 44. The coil spring 46 is contained in the chamber 53 and is interposed between the casing and a disc 54 that engages the end of the fluted stem of the double beat valve within the chamber 53.

When the electromagnet winding 47 is deenergized, spring 46 urges the double beat valve 45 to its upper seated position, thus closing communication between the chamber 49 and the atmospheric chamber 51 and establishing communication between the chamber 49 and the chamber 53 and connecting the chamber 42 of the relay valve device 16 to the straight-air pipe 14. When the electromagnet winding 47 is energized, the double beat valve 45 is shifted downwardly to its lower seated position to close the supply communication just described and to connect the chamber 49 and atmosphere chamber 51, thus causing fluid under pressure to be vented from the chamber 42 of the relay valve device 16.

The wheel-slip responsive device 18 is of the rotary inertia type described and claimed in my co-pending application, Serial No. 137,956, filed April 20, 1937, now Patent No. 2,140,620 and is illustrative of any suitable type of device for performing a corresponding function.

The wheel-slip responsive device 18 comprises a tubular casing 56 in which is contained a rotary inertia element in the form of a fly-wheel 57, a driving shaft 58 for the fly-wheel, and a switch device 59.

The driving shaft 58 is supported at opposite ends thereof by ball bearings 61, one of the bearings being contained in the end cover 62 of the casing 56 and the other being slidably supported within a bore 63 in the laterally projecting hub portion 64 of the fly-wheel 57.

The fly-wheel is supported to rotate within the casing by a ball bearing 65, at one end of the hub portion 64, that is arranged to move slidably in a bore 66 of the casing 56 and by another ball bearing 67 at the opposite end of the hub portion in a suitable recess in the face of the fly-wheel, the bearing 66 being arranged to rotatably and slidably support the fly-wheel on the shaft 58.

The shaft 58 may be driven in any suitable manner according to the speed of a vehicle wheel on which the brakes are applied by the brake cylinder 11 as by means of an endless belt, not shown, connecting a pulley 68 fixed on the outer end of the shaft 58 and another pulley fixed to the axle of the wheel.

The fly-wheel 57 is rotated by rotation of the shaft 58 through a clutch arrangement comprising a disc 69 fixed to the shaft 58, and a coil spring 71 so interposed between the fly-wheel and a collar or flange 72 fixed to the shaft 58 within the hub portion 64 of the fly-wheel as to urge the fly-wheel 57 and the disc 69 into interlocking or clutching engagement. Suitable thrust bearings 73 are provided for sustaining the axial thrust of the pulley 68 on the end cover 62 due to the force of the spring 104 and also the thrust of the spring on the fly-wheel 57.

The disc 69 and fly-wheel 57 are interlocked by means of a plurality of spaced pairs of complementary registering recesses 75 and 76 in the juxtaposed faces of the disc and fly-wheel, in each of which pairs of complementary recesses is contained a steel ball 78. Any suitable number of pairs of recesses 75 and 76 may be provided spaced circumferentially and radially outward from the shaft 58. As shown in my copending application referred to above, the recesses 75 and 76 are relatively short and of uniform curvature about the axis of the shaft 58 so that the recesses resemble somewhat the contour of a kidney bean.

Each of the recesses 75 and 76 varies in depth, along the arc thereof, with respect to the face of the disc or fly-wheel in which they are located, being deepest at the mid-point and sloping upwardly in opposite directions to the face of the disc or fly-wheel.

It will thus be seen that under the influence of spring 71, the steel balls 78 normally seat in the deepest portion of each pair of complementary recesses 75 and 76 so that the fly-wheel 57 and the disc 69 are accordingly normally interlocked for rotation together.

The compressive force or strength of the spring 71 is such as to maintain the fly-wheel 57 and the disc 69 in interlocking engagement, as shown, as long as the disc does not tend to decelerate or accelerate with respect to the fly-wheel in excess of a certain rate corresponding, for example, to a ten mile per hour per second rate of retardation or acceleration of the vehicle wheel driving the shaft 58. Such a high rate of acceleration or deceleration of the vehicle wheels will not occur during an application of the brakes unless by exceeding the limit of adhesion between the vehicle wheel and the rail surface along which the vehicle rolls, that is, by slipping the wheels.

When the shaft 58 decelerates at a rate corresponding to the deceleration of the associated vehicle wheels while slipping, the fly-wheel 57 tends to over-speed or lead the shaft 58 and when the shaft 58 accelerates according to the rate of acceleration of the vehicle wheel back toward a speed corresponding to vehicle speed while slipping, the fly-wheel 57 tends to under-speed or lag behind the shaft 58.

Due to the steel balls 78 interposed between the disc 69 and the fly-wheel 57, the rotative shift of the fly-wheel 57 either forwardly or backwardly of its normal position relative to the disc, causes the fly-wheel 57 to be shifted axially in the right-hand direction against the yielding resisting force of the spring 71.

The degree of rotative shift of the fly-wheel 57 relative to disc 69 is limited to prevent the steel balls from leaving the complementary recesses 75 and 76, as by one or more pins, not shown, in the disc or fly-wheel, that cooperate with arcuate slots or grooves, not shown, in the fly-wheel or disc, such construction being shown in detail in my above-mentioned copending application.

The switch device 59 of the wheel-slip responsive device 18 comprises a pair of cooperating resilient contact fingers 81 and 82, each of which is fixed at one end to an insulating member 83 secured within the casing 56 at the end of the hub portion 64 of the fly-wheel 57. The contact fingers 81 and 82 are disposed in spaced parallel relation in alignment with the axis of the hub portion 64 of the fly-wheel and are so spaced that the outer free ends thereof are normally disengaged. When the fly-wheel 57 is shifted in the right-hand direction as a result of shifting rotatively relative to the disc 59, the head of a screw plug 84 screwed into the outer open end of the hub 64 of the fly-wheel engages the free end of the contact finger 81 and flexes it laterally against the contact finger 82. A tip 85 of insulating material is provided on the free end of the contact finger 81 to prevent the direct engagement of the screw plug 84 on the fly-wheel therewith and the consequent grounding of the contact finger 81 to the casing.

The pressure switch 19 is illustrated in simple diagrammatic form and may comprise a casing containing a piston 91 having a stem 92 on which is carried in insulated relation a switch member 93 that is adapted to engage a pair of spaced contact members 94 stationarily mounted in insulated relation on the casing. A coil spring 95 is interposed between one face of the piston 91 and the casing and is effective normally to urge the piston 91 to a limit position in one direction in which the switch member 93 is out of engagement with its associated contact members 94. Formed in the casing on the side of the piston opposite to the spring 95 is a chamber 96 which is constantly connected to the straight-air pipe 14, as through a branch pipe 97.

The spring 95 is of such strength as to maintain the piston in a position that the switch member 93 is out of engagement with its contact members 94 as long as the pressure in the straight-air pipe does not exceed a certain uniform low pressure, such as five pounds per square inch. When the pressure in the straight-air pipe exceeds the uniform low pressure of five pounds per square inch, the piston 91 is shifted upwardly against the yielding resistance of the spring 95 to effect engagement of the switch member 93 with its associated contact members 94.

The self-holding relay 20 is a conventional type of electrical relay and, as diagrammatically shown, comprises an electromagnet winding 101 effective, when energized, to actuate an associated armature 102 carrying in insulated relation thereon a switch or contact member 103 from a position out of contact with a pair of associated contact members 104 to a position bridging or contacting both said contact members. When the electromagnet winding 101 is deenergized, the armature 102 and switch member 103 are biased by a spring, not shown, or by gravity to a position out of engagement with the contact members 104.

The time-controlled switch 21, hereinafter referred as the time switch, comprises a pressure switch 105 similar in construction to the pressure switch 19, a volume reservoir 106 and a check valve device 107.

The pressure switch 105 being identical in construction to the pressure switch 19, it is deemed unnecessary to repeat the description thereof except to point that corresponding parts in the two pressure switches are designated by the same reference numerals.

The check valve device 107 comprises a casing having a chamber 108 containing a valve 109 of the poppet type. The valve 109 is so arranged as to unseat from an associated valve seat formed on the casing to permit the rapid supply of fluid under pressure therepast from a branch pipe 111 of the brake cylinder pipe 31 to the chamber 108 and thence to the volume reservoir 106 which is connected to the chamber 108 as through a short pipe connection 112. The volume reservoir 106 is also connected to the piston chamber 96 of the pressure switch 105, as by a short pipe 113.

The valve 109 of the check valve device 107 is provided with a restricted port 114 therethrough to restrict the rate of back flow of fluid under pressure from the volume reservoir 106 to the pipe 31.

The spring 95 of the pressure switch 105 is of such strength that when the fluid pressure established in the volume reservoir 106 and effective in the chamber 96 on the piston 91 of pressure switch 105 exceeds a certain uniform low pressure, such as five pounds per square inch, the switch member 93 is actuated into contact with its associated contact members 94. Furthermore, the capacity of the volume reservoir 106 is such with respect to the flow area of the restricted port 114 in the valve 109 as to delay the operation of the pressure switch 105 to a position in which switch member 93 disengages its associated contact member 94 when the pressure in the brake cylinder 11 and pipe 31 is reduced below that in the volume reservoir 106.

The electromagnet winding 47 of the magnet valve device 17 is energized by current supplied from a suitable source such as a storage battery 115 which may be the storage battery for the lighting system on the car.

Electrical circuits, which will be specifically described hereinafter in connection with an assumed operation of the equipment, are provided for controlling energization and deenergization of the electromagnet winding 47 of the magnet valve device 17.

Operation of equipment

Assuming that the main reservoir 12 and the supply pipe 13 are charged to the normal fluid pressure carried therein as from a fluid compressor, not shown, and that while the car or train is traveling along the road under power or coasting, the operator desires to effect an application of the brakes, he may do so by first cutting off propulsion power, if the power is on, and then shifting the brake valve handle 25 into the application zone thereof a desired amount.

The straight-air pipe 14 is accordingly charged to a pressure corresponding to the position of the brake valve handle in the application zone and, since the electromagnet winding 47 of the magnet valve device 17 is deenergized, the piston chamber 42 of the relay valve device 16 is likewise charged through the branch pipe 44 to the pressure established in the straight-air pipe. When the pressure in the straight-air pipe 14 increases sufficiently, the pressure switch 19 is operated to effect engagement of the switch member 93 thereof with its associated contact members 94. Such operation, however, is without effect at this time as will be made apparent presently.

The relay valve device 16 is operated in response to the pressure of fluid supplied to piston chamber 42 thereof to supply fluid under pressure from the supply pipe 13 to the brake cylinder 11, and operates automatically to cut off the supply of fluid under pressure to the brake cylinder when the pressure established therein corresponds to the pressure established in the piston chamber 42.

Fluid under pressure supplied through pipe 31 to the brake cylinder 11 also flows through the branch pipe 111, unseats the valve 109 and flows at a rapid rate into the volume chamber 106 to cause operation of the switch member 93 of the pressure switch 105 into engagement with its associated contact members 94 when the pressure in the volume chamber is sufficiently built up. Such operation of the pressure switch 105 is, however, without effect at this time.

If the operator desires to further increase the degree of the application of the brakes, he may do so by further shifting the brake valve handle away from its normal release position, thereby further increasing the pressure in the straight-air pipe to cause operation of the relay valve device 16 to correspondingly increase the pressure in the brake cylinder 11. In a similar manner, if the operator desires to reduce the degree of application of the brakes from that initially established, he may do so by returning the brake valve handle toward its normal release position to reduce the pressure in the straight-air pipe, the release valve device 16 being correspondingly operated to vent fluid under pressure from the brake cylinder until the pressure in the brake cylinder corresponds to the reduced pressure in the straight-air pipe 14.

If the operator desires to completely release the brakes, he merely returns the brake valve handle 25 to its normal release position to reduce the pressure in the straight-air pipe 14 to atmospheric pressure, thus causing the relay valve device 16 to operate to completely vent fluid under pressure from the brake cylinder 11 and thus completely release the brakes.

In the above operation it was assumed that none of the wheels on the car or train slipped.

It will thus be observed that as long as none of the wheels on the car or train slip, the operation of the brake equipment is similar to that of conventional fluid pressure brake equipment.

Let it now be assumed that upon an application of the brakes, a wheel with which the brake cylinder 11 is associated begins to slip. Practically instantaneously with the initiation of slipping of the wheel, the wheel-slip responsive device 18 operates to effect engagement of the contact fingers 81 and 82 of the switch device 59 thereof. The closing of the switch device 59 completes a circuit for energizing electromagnet winding 47 of the magnet valve device 17, this circuit extending from one terminal, hereafter considered as the positive terminal, of the battery 115 through a wire 117, a branch wire 118, contact finger 81 of the switch device 59, contact finger 82, a wire 119, a branch wire 121, electromagnet winding 47 of the magnet valve device 17, a branch wire 122, wire 123, contact members 94 and switch member 93 of the pressure switch 19, and a wire 124 which is connected to the negative terminal of the battery 115.

The electromagnet winding 101 of the relay 20 is connected in parallel relation to the electromagnet winding 47 of the magnet valve device 17, and is thus energized simultaneously with the energization of the electromagnet winding 47, to shift the switch member 103 into contact with its associated contact members 104. A holding circuit is accordingly established for maintaining the electromagnet windings 47 and 101 energized independently of the switch device 59 of the wheel-slip responsive device 18, such circuit extending from the positive terminal of the battery 115 through wire 117, contact members 104 and switch member 103 of the relay 20, a wire 126, contact members 94 and switch member 93 of the pressure switch 105, wire 119, in parallel through electromagnet winding 47 of the magnet valve device 17 and electromagnet winding 101 of relay 20, wire 123, contact members 94 and switch member 93 of the pressure switch 19, and wire 124 to the negative terminal of the battery 115. Relay 20 is accordingly termed a self-holding relay because it establishes its own holding circuit.

Upon the energization of the magnet winding 47 of the magnet valve device 17, fluid under pressure is rapidly vented from the piston chamber 42 of the relay valve device 16 through the exhaust port 52 of the magnet valve device 17, and the relay valve device 16 is correspondingly operated to rapidly vent fluid under pressure from the brake cylinder through the exhaust port 32. At the same time, fluid under pressure in the volume reservoir 106 escapes therefrom at a relatively slow rate through the restricted port 114 in the valve 109 of the check valve device 107 into brake cylinder pipe 31 and exhausts to atmosphere through the exhaust port 32 of the relay valve device 16.

The rapid reduction of the pressure in the brake cylinder 11 and the consequent rapid reduction in the degree of application of the brakes is effective to cause the slipping wheel to cease deceleration and begin to accelerate back toward a speed corresponding to vehicle or rail speed before actually reaching a locked or sliding condition. When the slipping wheel changes from deceleration to acceleration, the switch device 59 of the wheel-slip responsive device 18 is momentarily opened due to the fly-wheel 57 shifting from a leading position to a lagging position through its normal position in response to the change in the rotative condition of the slipping wheel.

Since the magnet winding 47 of the magnet valve device 17 is maintained energized by the holding circuit including the relay 20 and the pressure switch 105 of the time switch 21, the momentary opening of the switch 59 of the wheel-slip responsive device 18 is without effect and the relay valve device 16 remains conditioned to continue to vent fluid under pressure from the brake cylinder 11.

When the slipping wheel approaches closely to a speed corresponding to vehicle speed and the rate of acceleration thereof decreases sufficiently, the switch 59 of the wheel-slip responsive device 18 is again opened due to the return of the fly-wheel 57 to its normal position with respect to disc 69. In such case also, the opening of the switch device 59 is without effect since the magnet winding 47 of the magnet valve device 17 continues to remain energized over the holding circuit including the relay 20 and the pressure switch 105 of the time switch 21.

The capacity of the volume reservoir 106 of the time switch 21 is such with respect to the flow area of the restricted port 114 in the valve 109 of the check valve device 107 that the pressure in the volume reservoir 106 effective to maintain the switch member 93 of the pressure switch 105 in contact with its associated contact members 94 does not reduce sufficiently to cause separation of the switch member 93 from its associated contact members 94 until the slipping wheel has definitely and fully returned to a speed corresponding to vehicle or rail speed. Obviously the volume of the reservoir 106 and the size of the restricted port 114 of the valve 109 may be varied so as to effect any desired time delay interval over which the pressure switch 105 is maintained in circuit-closing position following the initiation of venting of fluid under pressure from the brake cylinder 11.

When the pressure in the volume reservoir 106 has reduced sufficiently, the switch member 93 of the pressure switch 105 is shifted out of engagement with the contact members 94 and the holding circuit, previously described, for maintaining the magnet winding 47 of the magnet valve device 17 and magnet winding 101 of relay 20 energized is interrupted.

The magnet winding 47 of the magnet valve device 17 is accordingly deenergized and the double beat valve 45 of the magnet valve is returned to its upper seated position reestablishing the supply communication from the straight-air pipe 14 to the piston chamber 42 of the relay valve device 16. The relay valve device 16 is accordingly again operated to supply fluid under pressure from the supply pipe 13 to the brake cylinder 11 thereby effecting reapplication of the brakes on the wheel or wheels which slipped.

The supply of fluid under pressure to piston chamber 42 of relay valve device 16 tends to reduce the pressure in the straight-air pipe 14 but brake valve 15 operates automatically to supply fluid under pressure into the straight-air pipe 14, as previously pointed out, so that a pressure is maintained in the straight-air pipe corresponding to the displacement of the brake valve handle 25 out of its release position into the application zone.

Since it is customary for the engineman of a railway train to reduce the degree of a brake application as the speed of the train reduces, for well understood reasons, the operator of the present equipment may have returned the brake valve handle toward its release position from the position in which the slipping of the wheels was initiated. Thus, the pressure reestablished in the brake cylinder may be less than that which initiated the slipping of the wheels so that recurrence of wheel slipping is unlikely.

In the event that the vehicle wheel should again begin to slip due to the reapplication of the brakes thereon, the equipment again operates in the manner just described to release the brakes and restore the vehicle wheel to a speed corresponding to vehicle or rail speed before again reapplying the brakes.

It will be seen that whether a vehicle wheel slips one or more times during a brake application, the reapplication of the brakes is not effected in any event before the vehicle wheel returns fully to a speed corresponding to vehicle or rail speed. Furthermore, since the time switch 21 causes continued reduction of pressure in the brake cylinder 11 over the entire slipping period, adequate reduction in the pressure of the brake cylinder is assured even in cases where the brake shoes may stick to the tread or rim of the vehicle wheels and thus not instantly respond upon a reduction of brake cylinder pressure following as the result of slipping of the vehicle wheel.

Obviously, since the time switch 21 always opens to interrupt the holding circuit for the magnet valve device 17, it will be apparent that pressure is always restored in the brake cylinder 11 when the car or train comes to a complete stop, thus enabling all brake cylinders on the car or train to be effective to hold the car or train on a grade.

When it is desired to release the brakes prior to again starting the car, the operator merely shifts the brake valve handle 25 to release position as previously explained. Upon the reduction of the pressure in the straight-air pipe 14 to atmospheric pressure, the pressure switch 19 is of course operated to circuit-opening position and thus assures the interruption of all the electrical brake control circuits while the brakes are released. Thus, if the wheel-slip responsive device 18 is associated with the traction wheel of a vehicle and the wheel races due to the application of excessive propulsion torque to the wheel, the closing of the switch device 59 in response to such racing is ineffective to cause energization of the magnet valve 17. With the straight-air pipe 14 vented to atmosphere such energization of the magnet valve device 17 would not result in any objectionable operation. However, the pressure switch 19 prevents such energization and accordingly the unnecessary consumption of current from the battery 116.

Summary

It will accordingly be seen that I have disclosed a vehicle brake equipment adapted to operate automatically when a vehicle wheel begins to slip to rapidly vent fluid under pressure from the brake cylinder effecting application of the brakes on the slipping wheel, to cause the vehicle wheel to cease deceleration and accelerate back toward a speed corresponding vehicle or rail speed without actually reaching a locked state and sliding. It will be seen also that according to my invention the brake equipment which I have disclosed includes pneumatic timing switch means for insuring adequate reduction of the brake cylinder pressure as well as the prevention of the reapplication of the brakes prior to the time that the vehicle wheels fully and definitely return to a speed corresponding to vehicle or rail speed.

It should be understood that the equipment shown and described may be duplicated in part on all cars or car trucks of a train so as to guard against sliding of all the car wheels on a train.

Thus while I have described only one specific embodiment of my invention it should be apparent that various omissions, additions or modifications may be made in the embodiment shown without departing from the spirit of my invention. It is therefore not my intention to limit the scope of my invention except as it is necessitated by the scope of the prior art.

Having now described my invention, what I claim as new and desire to secure by Letters Patent, is:

1. In a vehicle wheel brake equipment, the combination of a magnet valve device having a normal position establishing a communication through which fluid under pressure may be supplied to effect application of the brakes and operative to a different position closing said communication and establishing a different communication through which fluid under pressure is released to effect release of the brakes, means operative when a vehicle wheel slips due to application of the brakes thereon for effecting operation of said magnet valve device to its said different position, and means rendered effective in response to initiation of slipping of the wheel for preventing operation of the magnet valve device out of its said different position for a certain limited time after the slipping of the wheel is initiated.

2. In a vehicle wheel brake equipment, the combination of a magnet valve device normally deenergized and effective when deenergized to establish a communication through which fluid under pressure may be supplied to effect an application of the brakes on a vehicle wheel and effective when energized to close said communication and establish a different communication through which fluid under pressure is released to effect release of the brakes, means operative when the vehicle wheel slips due to application of the brakes thereon for effecting energization of said magnet valve device, and means rendered effective at the instant the wheel begins to slip for maintaining said magnet valve device energized for a certain limited time thereafter following the initiation of slipping of the wheel.

3. In a vehicle wheel brake equipment, the combination of a magnet valve device normally in a position to establish a communication through which fluid under pressure may be supplied to effect application of the brakes on a vehicle wheel and operative upon a change in the degree of energization thereof to a different position in which it closes said communication and establishes a different communication through which fluid under pressure is released to effect release of the brakes, means operative when the vehicle wheel slips due to application of the brakes thereon for effecting a variation of the energization thereof resulting in operation thereof to said different position, and means rendered effective at the instant the wheel begins to slip for thereafter preventing a variation of energization of the magnet valve device and return thereof to its normal position from its said different position for a certain limited time following the initiation of slipping of the wheels.

4. In a vehicle wheel brake equipment, the combination of a magnet valve device normally in a position to establish a communication through which fluid under pressure may be supplied to effect an application of the brakes on a vehicle wheel and operative to a different position in which said communication is closed and a different communication is established through which fluid under pressure is released to effect release of the brakes, a first circuit including said magnet valve device, a normally open switch device operative to close said first circuit and thereby effect energization of said magnet valve device and the operation thereof to its said different position when the wheel begins to slip, a second circuit also including said magnet valve device, an electro-responsive switch device operative to a position to close said second circuit when the wheel begins to slip to maintain said magnet valve device energized independently of said first circuit, and a time-controlled switch device for interrupting said second circuit a certain limited time after said valve device operates to initiate the release of the brakes.

5. In a vehicle brake equipment, the combination of a magnet valve device normally deenergized and effective when deenergized to establish a communication through which fluid under pressure may be supplied to effect an application of the brakes on a vehicle wheel and operative to a different position when energized to close said communication and establish a different communication through which fluid under pressure is released to effect release of the brakes, means operative when the vehicle wheel begins to slip for effecting energization of said magnet valve device, switch means for establishing and maintaining a holding circuit for maintaining said magnet valve device energized in response to the initial energization of the magnet valve device, and a time-controlled switch means for interrupting the holding circuit of the magnet valve device to cause return of the magnet valve device to its normal position only when a certain limited time has elapsed after the magnet valve device is initially energized.

6. In a vehicle brake equipment of the type having a brake cylinder to which fluid under pressure is supplied to effect application of the brakes on a vehicle wheel and from which fluid under pressure is released to effect release of the brakes, the combination of a relay valve device operative in response to the pressure of fluid supplied thereto to establish a corresponding pressure in the brake cylinder, valve means normally in a position to establish communication through which fluid under pressure may be supplied to the relay valve means and operative to a different position to interrupt said communication and establish a different communication through which fluid under pressure is released from the relay valve means to effect release of fluid under pressure from the brake cylinder, means operative when a vehicle wheel begins to slip for effecting operation of the valve means to its said different position, means providing a chamber arranged to be charged with fluid under presure when fluid under pressure is supplied to the brake cylinder and from which fluid under pressure is released when fluid under pressure is released from the brake cylinder, means for restricting the reduction of pressure in the said chamber to a rate slower than that of the brake cylinder, and means controlled by the pressure in said chamber for maintaining said valve means in its said different position as long as the pressure in said chamber exceeds a certain uniform pressure.

7. In a vehicle brake equipment, the combination of a magnet valve device normally deenergized and effective when deenergized to establish communication through which fluid under pressure may be supplied to effect an application of the brakes on a vehicle wheel and effective when energized to close said communication and establish a different communication through which fluid under pressure is released to effect release of the brakes, a first circuit including said magnet valve device, means operative when the vehicle wheel begins to slip for closing said first circuit to effect energization of said magnet valve device, a second circuit including said magnet valve device, an electroresponsive means in parallel relation to said magnet valve device and operative upon energization to complete said second circuit to maintain said magnet valve device and itself energized independently of the first circuit, and time-controlled switch means for interrupting said second circuit a certain limited time after said first circuit is initially energized.

8. In a vehicle brake equipment of the type having a brake cylinder to which fluid under pressure is supplied to effect an application of the brakes on a vehicle wheel and from which fluid under pressure is released to effect release of the brakes, the combination of a relay valve device operative in response to the pressure of fluid supplied thereto to establish a corresponding fluid pressure in the brake cylinder and in response to the reduction of pressure supplied thereto to effect a corresponding reduction of the pressure in the brake cylinder, valve means normally in a position to establish communication through which fluid under pressure may be supplied to the relay valve means and operative to a different position to close said supply communication and establish a different communication through which fluid under pressure is released from the relay valve means, means effective when the vehicle wheel begins to slip to effect operation of the said valve means to its said different position, means providing a chamber, a check valve device adapted to permit the rapid supply of fluid under pressure therepast from the brake cylinder to said chamber and to permit only a restricted back flow of fluid under pressure therepast from the said chamber, and means effective as long as the pressure in said chamber exceeds a certain uniform pressure following the initiation of the slipping of the wheel for preventing the return of said valve means from its said different position to its said normal position.

9. In a vehicle brake equipment, the combination of a magnet valve device normally deenergized and effective when deenergized to establish a communication through which fluid under pressure may be supplied to effect an application of the brakes on a vehicle wheel and effective when energized to close said communication and establish a different communication through which fluid under pressure is released to effect release of the brakes, inertia operated switch means effective to cause energization of said magnet valve device as long as the vehicle wheel is decelerating or accelerating in excess of a certain rate while slipping due to application of the brakes, electroresponsive switch means adapted to be energized and deenergized together with the said magnet valve device, a pressure operated switch device operative in response to the pressure of fluid supplied to effect application of the brakes to a position where conjointly with said electroresponsive switch device it is effective to maintain said magnet valve device energized notwithstanding the operation of the inertia operated switch device to a position for effecting deenergization of the magnet valve device, and means for reducing the pressure actuating the pressure switch at a restricted rate when the release of the brakes is initiated in response to slipping of the vehicle wheel whereby to maintain said pressure switch in a position to maintain the magnet valve energized for a limited time following the initial energization thereof by the inertia operated switch device.

10. In a vehicle brake equipment, the combination of a brake cylinder for operating the brakes associated with a vehicle wheel, relay valve means operatively responsive to variations of a control fluid pressure to correspondingly vary the fluid pressure in the brake cylinder to effect variations of the degree of application and the release of the brakes, means effective in response to slipping of the wheel during an application of the brakes for effecting such variation of the control pressure as to cause the relay valve means to vary the pressure in the brake cylinder so as to effect release of the brakes, and means effective, once the relay valve means is operated under the control of the last said means to vary the pressure in the brake cylinder so as to release the brakes, to cause the relay valve means to continue to so vary the pressure in the brake cylinder as to effect the continued reduction in the degree of application of the brakes for a certain limited time thereafter independently of the rotative condition of the wheel.

11. In a vehicle brake equipment, the combination of a brake cylinder for operating the brakes associated with a vehicle wheel, relay valve means operatively responsive to an increase of a control pressure therefor for supplying fluid at a corresponding pressure to the brake cylinder to effect application of the brakes and responsive to a reduction of the control pressure for releasing fluid under pressure from the brake cylinder to effect release of the brakes, means providing a communication through which the control fluid pressure is supplied to and released from the relay valve means, manually controlled means for controlling the supply of fluid under pressure to and the release of fluid under pressure from the relay valve means through said communication, valve means interposed between the relay valve means and the manually controlled means in said communication effective in one position to open said communication and operative to a second position to close said communication and at the same time effect the release of the control fluid pressure from the relay valve means so as to effect release of the brakes independently of the manually controlled means, means operative in response to initiation of slipping of the wheel during an application of the brakes for causing operation of the said valve means to its said second position, and means effective once the said valve means is operated to its said second position for maintaining the valve means thereafter in its said second position for a certain limited time thereafter independently of subsequent changes in the rotative condition of the wheel.

CLYDE C. FARMER.